(12) United States Patent
Kluesener et al.

(10) Patent No.: US 11,101,066 B2
(45) Date of Patent: Aug. 24, 2021

(54) ELECTROMAGNETIC COIL

(71) Applicant: Sensata Technologies, Inc., Attleboro, MA (US)

(72) Inventors: Casey R. Kluesener, Santa Barbara, CA (US); Christopher B. Thomas, Ojai, CA (US)

(73) Assignee: Sensata Technologies, Inc., Attleboro, MA (US)

( * ) Notice: Subject to any disclaimer, the term of this patent is extended or adjusted under 35 U.S.C. 154(b) by 960 days.

(21) Appl. No.: 15/692,037

(22) Filed: Aug. 31, 2017

(65) Prior Publication Data

US 2019/0066913 A1 Feb. 28, 2019

(51) Int. Cl.
*H01F 17/04* (2006.01)
*H01F 27/32* (2006.01)
(Continued)

(52) U.S. Cl.
CPC ......... *H01F 27/32* (2013.01); *B29C 63/0017* (2013.01); *B29C 63/0069* (2013.01); *B29C 63/065* (2013.01); *B29C 63/24* (2013.01); *B29C 70/16* (2013.01); *C04B 35/14* (2013.01); *C04B 35/62222* (2013.01); *C04B 35/64* (2013.01); *C04B 35/80* (2013.01); *C04B 35/803* (2013.01); *C04B 35/806* (2013.01); *C04B 35/82* (2013.01); *C04B 41/009* (2013.01); *C04B 41/5035* (2013.01); *C04B 41/87* (2013.01); *H01F 5/02* (2013.01); *H01F 5/06* (2013.01); *H01F 27/2823* (2013.01); *H01F 27/324* (2013.01); *H01F 27/325* (2013.01); *H01F 27/327* (2013.01); *H01F 41/098* (2016.01); *H01F 41/12* (2013.01); *H01F 41/127* (2013.01); *B29K 2309/02* (2013.01); *B29K 2309/08* (2013.01);
(Continued)

(58) Field of Classification Search
CPC ..... H01F 27/324; H01F 27/325; H01F 27/327
USPC .......................................................... 336/221
See application file for complete search history.

(56) References Cited

U.S. PATENT DOCUMENTS 3,343,984 A 9/1967 Saums et al.
3,352,009 A 11/1967 Larchmont et al.
(Continued)

FOREIGN PATENT DOCUMENTS

JP H02222511 A 9/1990

OTHER PUBLICATIONS

English translation of JP10032897 (Year: 1998).*
(Continued)

*Primary Examiner* — Ronald Hinson
(74) *Attorney, Agent, or Firm* — Mark H. Whittenberger, Esq.; Holland & Knight LLP

(57) ABSTRACT

An electromagnetic coil with improved insulation properties at high temperatures. A bobbin is insulated by a thin ceramic composite layer that is produced by winding a glass or ceramic fiber over the support structure and impregnating it with a pre-ceramic polymer. The pre-ceramic polymer is then modified to form a ceramic $SiO_2$ matrix around the fibrous layer. The ceramic matrix secures the glass or ceramic fibers in place and produces a dense layer. A ceramic coated magnet wire is then wound around the insulated support structure. The magnet wire is a conductor that is spiral-wrapped with a glass fiber impregnated with a pre-ceramic polymer.

11 Claims, 5 Drawing Sheets

(51) Int. Cl.
| | |
|---|---|
| B29C 63/00 | (2006.01) |
| C04B 35/14 | (2006.01) |
| C04B 35/80 | (2006.01) |
| H01F 41/12 | (2006.01) |
| H01F 5/06 | (2006.01) |
| H01F 41/098 | (2016.01) |
| B29C 63/06 | (2006.01) |
| B29C 63/24 | (2006.01) |
| B29C 70/16 | (2006.01) |
| C04B 35/622 | (2006.01) |
| C04B 35/64 | (2006.01) |
| C04B 35/82 | (2006.01) |
| C04B 41/00 | (2006.01) |
| C04B 41/50 | (2006.01) |
| C04B 41/87 | (2006.01) |
| H01F 5/02 | (2006.01) |
| H01F 27/28 | (2006.01) |
| B29K 309/02 | (2006.01) |
| B29K 309/08 | (2006.01) |
| B29L 31/00 | (2006.01) |

(52) U.S. Cl.
   CPC .  *B29K 2995/0008* (2013.01); *B29L 2031/711* (2013.01); *C04B 2235/483* (2013.01); *C04B 2235/5216* (2013.01); *C04B 2235/5232* (2013.01); *C04B 2235/96* (2013.01)

(56) References Cited

U.S. PATENT DOCUMENTS

| | | | |
|---|---|---|---|
| 3,365,688 A | 1/1968 | Saums et al. | |
| 5,154,954 A | 10/1992 | Croop et al. | |
| 6,407,339 B1 | 6/2002 | Rice et al. | |
| 9,627,122 B2 | 4/2017 | Mahajan et al. | |
| 2003/0079805 A1* | 5/2003 | Hamada | H01F 41/026 148/105 |
| 2009/0114416 A1 | 5/2009 | Kaiser et al. | |
| 2010/0108353 A1 | 5/2010 | Kaiser et al. | |
| 2010/0255282 A1 | 10/2010 | Hong et al. | |
| 2012/0218066 A1* | 8/2012 | Inaba | H01F 37/00 336/83 |
| 2014/0302258 A1* | 10/2014 | Mathieu | G01R 33/3858 427/596 |
| 2015/0213929 A1 | 7/2015 | Piascik et al. | |
| 2018/0053595 A1* | 2/2018 | Elliott | H01B 3/082 |

OTHER PUBLICATIONS

Combined Search and Examination Report from related Great Britain Application No. GB1809692.5 dated Nov. 27, 2018.
Great Britain Examination Report in related Great Britain Application No. GB1809692.5 dated Sep. 14, 2020, 2 pages.

* cited by examiner

ELECTROMAGNETIC COIL

BACKGROUND OF THE INVENTION

An electromagnetic coil is used in a number of different devices, such as, Linear Variable Differential Transformers (LVDTs), Rotary Variable Differential Transformers (RVDTs), solenoids, motors and generators. In the case of an LVDT or solenoid, an electromagnetic coil is manufactured by winding a magnet wire around a support structure, for example, a hollow bobbin. The magnet wire is typically a copper conductor coated with an organic polymer, such as polyimide.

The bobbin, or other support structure, is often coated with an electrically insulating material, e.g., tape or powder coating, or is made from an electrically insulating material, e.g., a plastic or ceramic bobbin. This insulation provides an additional dielectric barrier in the event of an electrical overload to the magnet wire.

In a typical LVDT, one or more secondary coils are wound over a primary coil and electrical insulation is provided between the primary and secondary coils. This is typically accomplished with insulating tape.

The materials that are used in manufacturing known coils have a temperature limit of 450-550° F. The organic polymers, tapes, plastics and powder coatings in these known devices break down at temperatures above 500° F. Copper conductors oxidize rapidly without limit above 450° F. possibly leading to failures due to coil shorts.

Consequently, the failure of the insulation of known coils at temperatures exceeding 500° F. prevents them from meeting the dielectric and insulation standards typically required in aerospace applications.

There is a demand for LVDTs and solenoids for the high temperature and high vibration environments of aerospace applications. The traditional manufacturing methods of making electromagnetic coils for these devices are not sufficient to produce a coil that can withstand the extremely high temperatures demanded. Previous attempts to produce high temperature coils have resulted in both poor insulation performance and poor electrical performance as a result of the brittleness and increased thickness of high temperature insulation.

What is needed is an electromagnetic coil that can remedy the deficiencies of known devices.

BRIEF SUMMARY OF THE INVENTION

In one aspect of the present disclosure, a method of making an electromagnetic coil comprises providing a first polymer resin about a support structure; modifying the first polymer resin to create an inorganic first layer; winding a conductor comprising a second polymer resin around the first layer; and decomposing the cured second polymer resin.

In another aspect of the present disclosure, a method of making an electromagnetic coil, comprises providing a first polymer resin about a support structure; curing the first polymer resin; creating a first layer by decomposing the cured first polymer resin; winding a magnet wire around the first layer and the support structure, the magnet wire comprising an outer cladding, the outer cladding comprising cladding yarn and a cured second polymer resin; and decomposing the cured second polymer resin of the outer cladding.

In another aspect of the present disclosure, an electromagnetic coil comprises a support structure; a first layer disposed on the support structure, the first layer comprising a decomposed first polymer resin; and a second layer disposed about the first layer, the second layer comprising a conductor and a decomposed second polymer resin.

In another aspect of the present disclosure, an electromagnetic coil comprises a support structure; a first layer disposed on the support structure, the first layer comprising fiber and a decomposed first polymer resin; and a second layer disposed about the first layer, the second layer comprising a conductor and a decomposed second polymer resin.

BRIEF DESCRIPTION OF THE DRAWINGS

Various aspects of at least one embodiment of the present disclosure are discussed below with reference to the accompanying figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, not every component may be labeled in every drawing. The figures are provided for the purposes of illustration and explanation and are not intended as a definition of the limits of the invention. In the figures.

DETAILED DESCRIPTION

Figure 1:
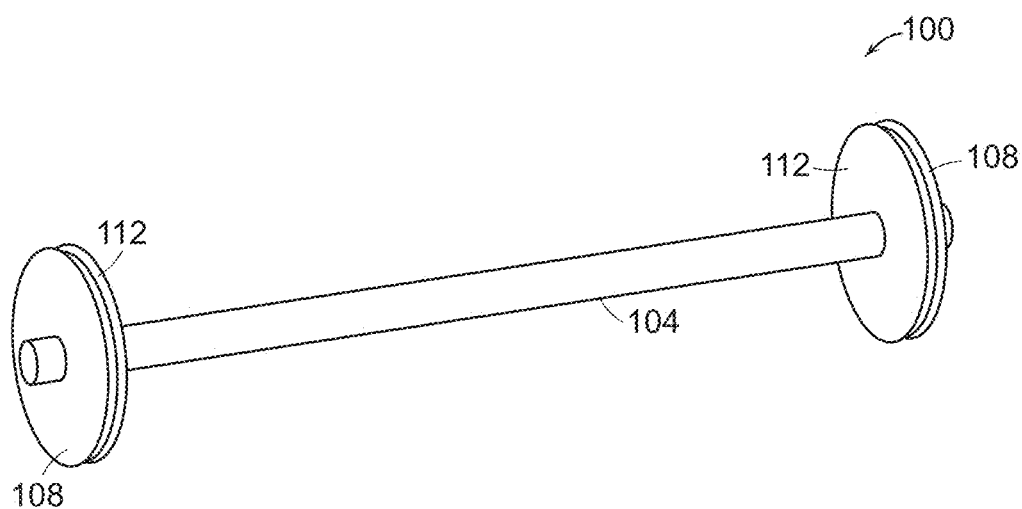
FIG. 1 is a support structure in accordance with an aspect of the present disclosure.

In the following detailed description, numerous specific details are set forth in order to provide a thorough understanding of the embodiments of the present disclosure. It will be understood by those of ordinary skill in the art that these embodiments may be practiced without some of these specific details. In other instances, well-known methods, procedures, components and structures may not have been described in detail so as not to obscure the described embodiments.

Prior to explaining at least one embodiment in detail, it is to be understood that these are not limited in their application to the details of construction and the arrangement of the components set forth in the following description or illustrated in the drawings. Also, it is to be understood that the phraseology and terminology employed herein are for the purpose of description only and should not be regarded as limiting.

Advantageously, as will be described below, aspects of the present disclosure regarding an electromagnetic coil of an LVDT that meets the environmental requirements of an aerospace application, e.g., high operating temperatures and extreme vibrations, includes:

a magnet wire with insulation that is fully inorganic, e.g., glass or ceramic, amenable to winding, i.e., the insulation is not brittle, is resilient to thermal and vibrational stresses, and is sufficiently thin to produce dimensionally compact coils;

a support structure (bobbin) insulation that is fully inorganic, e.g., glass or ceramic, and which possesses dielectric properties to meet stringent requirements of aerospace applications, is resilient to thermal and vibrational stresses, and is thin, generally less than 0.030" thickness, to produce dimensionally compact coils; and coil-to-coil insulation, i.e., where isolated coils are wound over one another as is common in LVDTs, is also fully inorganic, e.g., glass or ceramic, possesses dielectric properties to meet stringent requirements of aerospace applications, is resilient to thermal and vibrational stresses, and is thin, generally less than 0.030" in thickness, to produce dimensionally compact coils.

Thus, the electromagnetic coil of the present disclosure has a compact form with reliable insulation properties. As described below, the bobbin is insulated by a thin ceramic composite layer that, in one aspect, is produced by winding a glass or ceramic fiber over the support structure and impregnating the fiber with a pre-ceramic polymer. The pre-ceramic polymer is then modified to form a ceramic matrix around the fibrous layer by, for example, curing and decomposing processes, as described below in more detail. The ceramic matrix secures the glass or ceramic fibers in place and produces a dense layer. In one aspect, the pre-ceramic polymer is processed to produce a $SiO_2$ matrix. This electrically insulating layer is thin and resilient to high temperatures and high vibration. A ceramic coated magnet wire is then wound around the insulated support structure. In one aspect, the magnet wire is a conductor that is helically wrapped with a glass fiber impregnated with a pre-ceramic polymer.

As shown in FIG. 1, a support structure, or bobbin 100 includes a hollow tube portion 104 and washers 108. The tube 104 and washers 108 are, typically, metallic, e.g., stainless steel. In addition, a ceramic washer 112 is positioned adjacent each washer 108 to electrically insulate the magnet wires, described below, from the washers 108.

Figure 2:
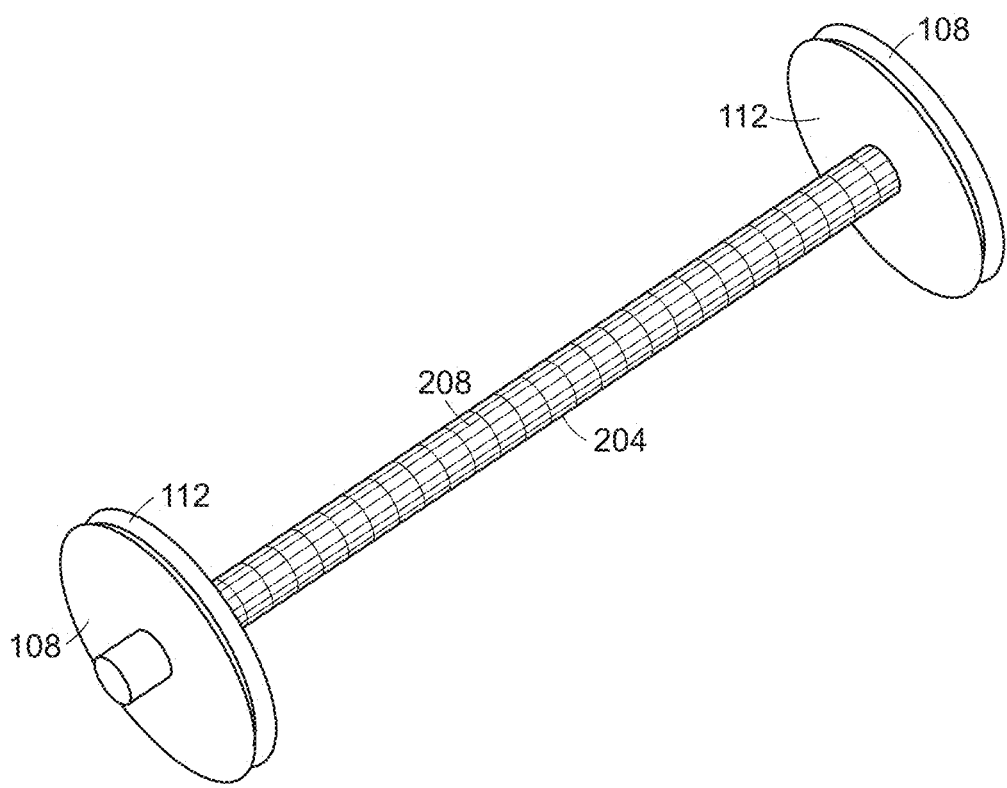
FIG. 2 is the support structure with an insulation layer in accordance with an aspect of the present disclosure.

In order to provide the advantageous insulation properties of the electromagnetic coil of this disclosure, an insulation layer 204 is provided on the bobbin 100, as shown in FIG. 2. The insulation layer 204 includes a glass or ceramic fiber 208. The fiber 208, in one aspect, can be wound around the tube 104 of the bobbin 100. Alternatively, the fiber 208 may be in the form of a braided sleeve or a woven fabric, each of which can be provided, for example, wrapped, around the tube 104 of the bobbin 100.

The fiber 208 may be a glass fiber, e.g., E glass, S glass, etc., or a ceramic fiber, e.g., Nextel 312, Silica fiber, Quartz Fiber, etc.

The fiber 208 is impregnated with a pre-ceramic polymer resin, for example, but not limited to, polysiloxane or polysilazane. The pre-ceramic polymer resin can be applied to the fiber 208 before, i.e., "pre-pregging," the fiber 208 is wrapped around the bobbin 100. Alternatively, the pre-ceramic polymer resin can be applied during the process, i.e., as the fiber 208 is wrapped around the bobbin 100. Still further, the pre-ceramic polymer resin can be applied after the fiber 208 is wrapped around the bobbin. In addition, ceramic filler powders can be added to the starting pre-ceramic polymers to adjust the final ceramic matrix properties for high temperature electrical properties as needed.

After the resin-impregnated fiber 208 is wrapped around the bobbin 100, the pre-ceramic polymer is then crosslinked, i.e., cured by the application of heat, pressure, radiation, or by a change in pH, as known by one of ordinary skill in the art. Once cured, the polymer can be sanded or machined as necessary. Subsequent to curing, and any finishing, the wrapped support structure is heated in order to thermally decompose the pre-ceramic polymer into $SiO_2$, i.e., decompose and remove the organic portions of the polymer, leaving the inorganic portion of the polymer, which binds the glass or ceramic fibers together. In one aspect, the wrapped structure is baked at a temperature in the range of 600-800° F., for example, 700° F., in air, i.e., an oxidizing atmosphere.

Figure 3:
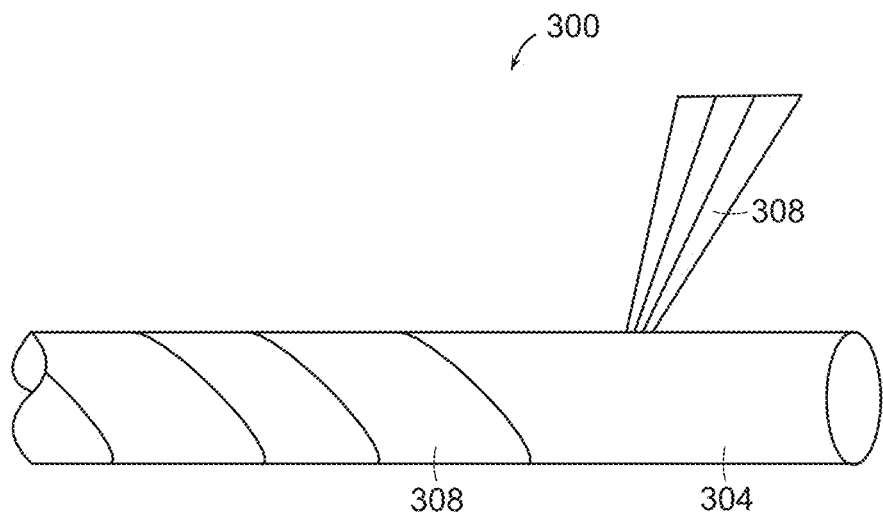
FIG. 3 is a magnet wire in accordance with an aspect of the present disclosure.

A magnet wire 300, as shown in FIG. 3, is used in the electromagnetic coil of the present disclosure. The magnet wire 300 is manufactured by providing a conductor 304 with a glass fiber yarn 308 that is helically wrapped around the conductor 304 which is then run through a bath of a pre-ceramic polymer, e.g., polysiloxane or polysilazane. Once impregnated with the pre-ceramic polymer, the magnet wire 300 is then brought to a temperature in the range of 400-500° F. to cross-link, i.e., cure, the polymer, which binds the glass fiber filaments together in a flexible polymer matrix.

Figure 4:
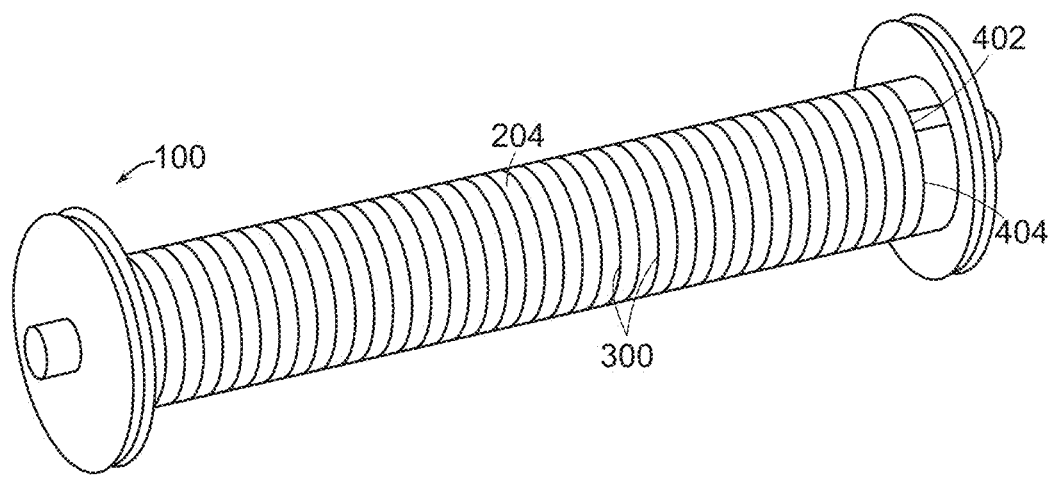
FIG. 4 is a representation of the magnet wire wound around the insulation layer in accordance with an aspect of the present disclosure.
Figure 5:
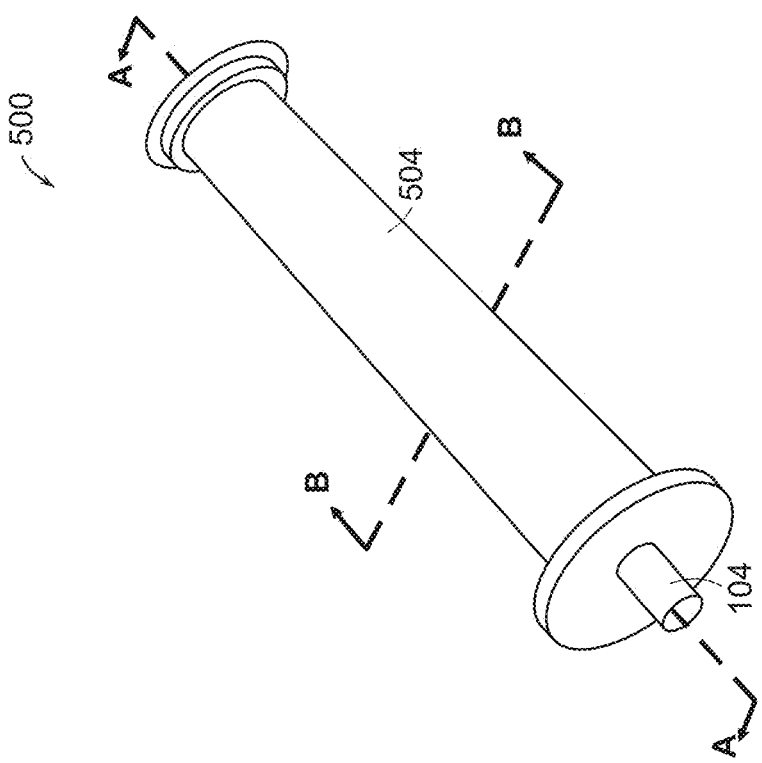
FIG. 5 is a representation of an electromagnetic coil in accordance with an aspect of the present disclosure.

The magnet wire 300 is then wound around the bobbin 100 leaving two free ends 402, 404 for subsequent connection, as shown in FIG. 4. Once the desired amount of magnet wire 300 is wound, the pre-ceramic polymer is thermally decomposed into $SiO_2$, i.e., a ceramic, by exposing it to a temperature in the range of 600-800° F., for example, 700° F. This curing step results in an electromagnetic coil 500 having a ceramic composite layer 504, i.e., an electrically insulating layer, formed about the coil of magnet wire 300, as shown in FIG. 5.

Figure 6:
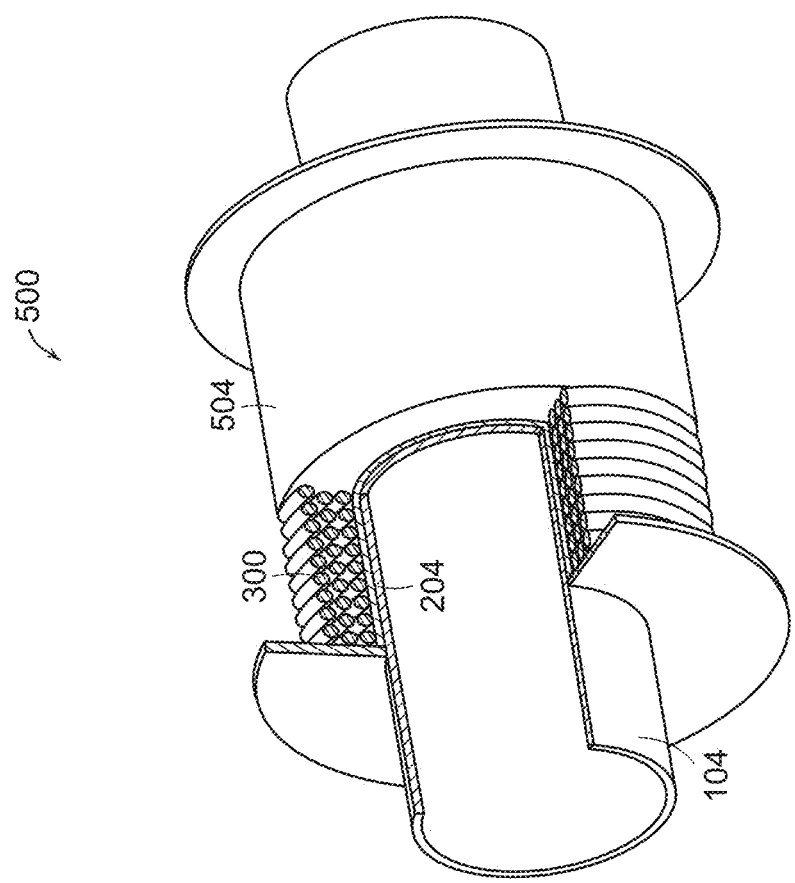
FIG. 6 is a partial cross-section of the electromagnetic coil of FIG. 5.
Figure 7:
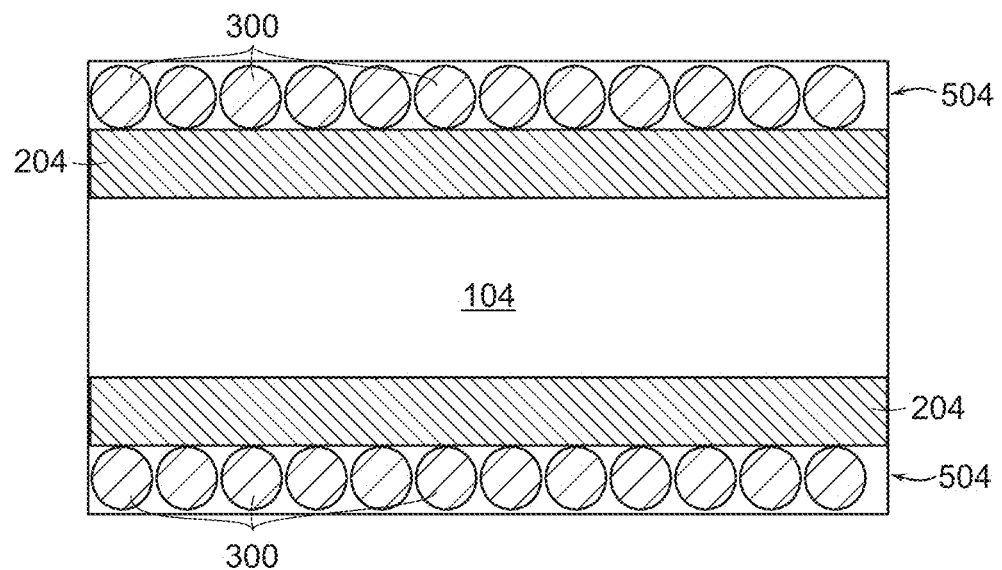
FIG. 7 is a cross-section of the electromagnetic coil of FIG. 5 along the line A-A.
Figure 8:
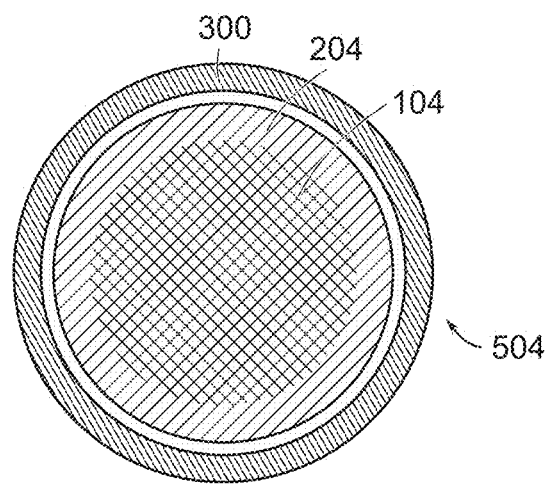
FIG. 8 is a cross-section of the electromagnetic coil of FIG. 5 along the line B-B.
Figure 9:
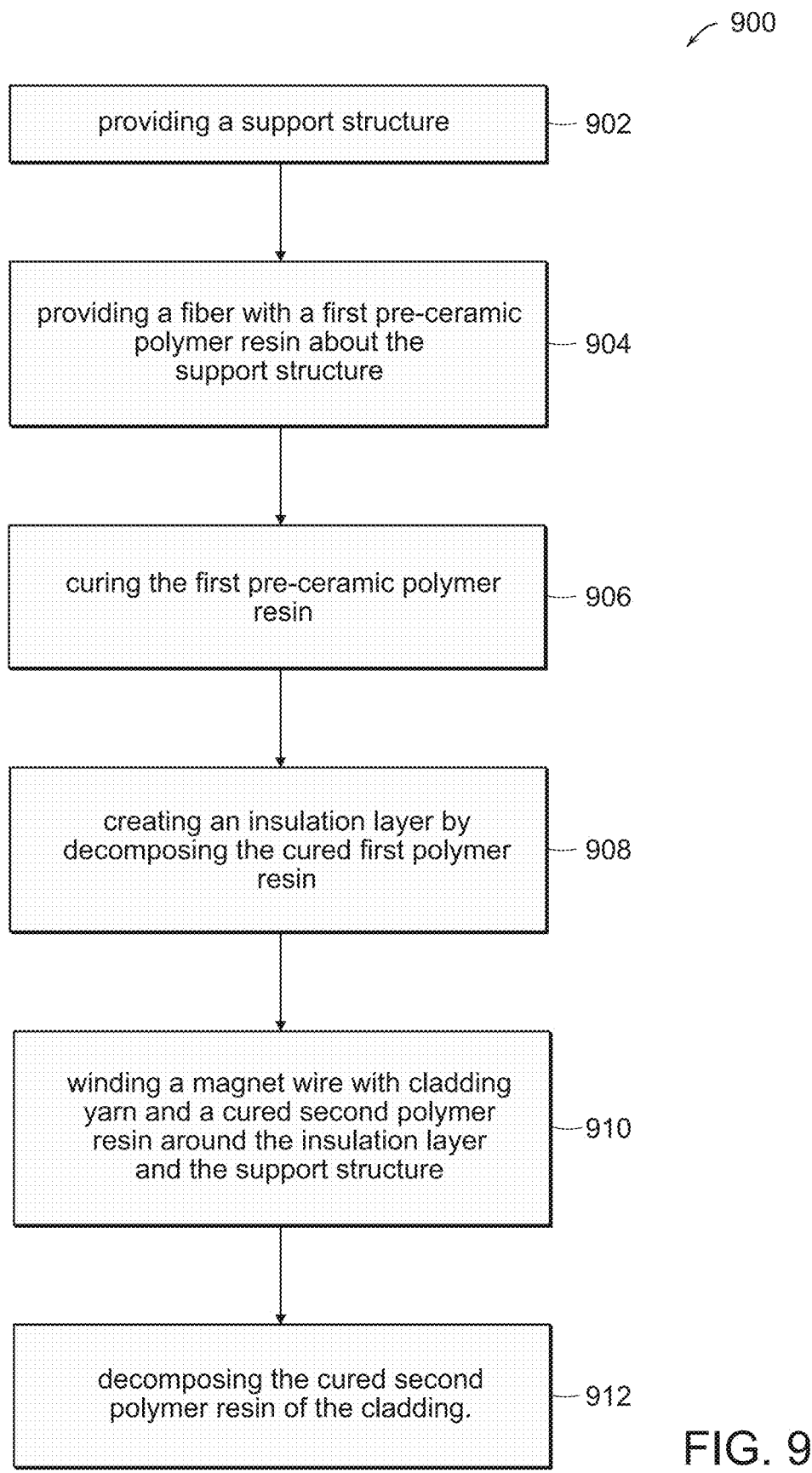
FIG. 9 is a flowchart of a method in accordance with an aspect of the present disclosure.

A partial cross-section of the electromagnetic coil 500 is presented in FIG. 6. A cross-section of the electromagnetic coil 500 along the line A-A as shown in FIG. 5 is presented in FIG. 7. A cross-section of the electromagnetic coil 500 along the line B-B as shown in FIG. 5 is presented in FIG. 8.

Advantageously, a second magnet wire may be wound around the first as per the above description. Once the pre-ceramic polymer of the second magnet wire is decomposed into $SiO_2$, the two magnet wires will be insulated from one another. As many magnet wires as are needed can be provided in this manner.

In accordance with another aspect of the present disclosure, a method 900 of making an electromagnetic coil includes providing a support structure, step 902, and providing a fiber with a first pre-ceramic polymer resin about the support structure, step 904, for example, by wrapping. The fiber may be a yarn, a roving, a chopped fiber, a braided sleeve or a woven fabric. Next, step 906, curing the first pre-ceramic polymer resin and then creating an insulation layer by decomposing the cured first polymer resin, step 908. Next, step 910, winding a magnet wire around the insulation layer and the support structure. The magnet wire having an outer cladding including yarn and a cured second polymer resin. Next, step 912, decomposing the cured second polymer resin of the outer cladding.

In addition, the first or second polymer resin may be cured by applying heat to thermally decompose the polymer resin into $SiO_2$. The yarn wrapped around the magnetic wire may comprise glass fibers and may be helically wrapped around the conductor wire.

As set forth above, the resin-impregnated fiber is wrapped around the support structure and the pre-ceramic polymer is then cured and decomposed to provide the insulation layer. In an alternate approach, a pre-cured and pre-decomposed first insulation layer is created, for example, in the shape of a hollow cylinder, or as necessary to correspond with the support structure. This cylinder would then be placed over the support structure and then a magnet wire, etc., would be provided as described above.

Further, in an alternative to winding the magnet wire as described above, a pre-wound coil of magnet wire prepared in accordance with the foregoing, and configured to fit over the support structure, can be created.

It is appreciated that certain features, which are, for clarity, described in the context of separate embodiments, may also be provided in combination in a single embodiment. Conversely, various features, which are, for brevity, described in the context of a single embodiment, may also be provided separately or in any suitable sub-combination.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

Although the present disclosure has been described herein with reference to particular embodiments, the present disclosure is not intended to be limited to the particulars disclosed herein; rather, the present disclosure extends to all functionally equivalent structures, methods and uses, such as are within the scope of the claims.

The invention claimed is:

1. An electromagnetic coil, comprising:
   a support structure;
   a first layer disposed on the support structure, the first layer comprising a first polymer resin that has been thermally decomposed to leave an inorganic portion of the polymer; and
   a second layer disposed about the first layer, the second layer comprising a conductor and a second polymer resin that has been thermally decomposed to leave an inorganic portion of the polymer.

2. The electromagnetic coil of claim 1, wherein the first layer comprises glass or ceramic fiber filaments.

3. The electromagnetic coil of claim 1, wherein the first layer further comprises ceramic filler powder.

4. The electromagnetic coil of claim 1, wherein each of the first and second polymer resins comprises at least one of: polysiloxane or polysilazane.

5. The electromagnetic coil of claim 1, wherein the conductor comprises:
   a conductive wire having an outer cladding comprising glass fiber filaments.

6. An electromagnetic coil, comprising:
   a support structure;
   a first layer disposed on the support structure, the first layer comprising fiber and a first polymer resin that has been thermally decomposed to leave an inorganic portion of the polymer; and
   a second layer disposed about the first layer, the second layer comprising a conductor and a second polymer resin that has been thermally decomposed to leave an inorganic portion of the polymer.

7. The electromagnetic coil of claim 6, wherein the fiber comprises glass filaments.

8. The electromagnetic coil of claim 6, wherein the first layer further comprises ceramic filler powder.

9. The electromagnetic coil of claim 6, wherein at least one of the first and second polymer resins comprises at least one of: polysiloxane or polysilazane.

10. The electromagnetic coil of claim 6, wherein at least one of the decomposed first and second polymer resins comprises $SiO_2$.

11. The electromagnetic coil of claim 6, wherein the conductor comprises: a conductive wire having an outer cladding comprising glass fiber filaments.

* * * * *